United States Patent [19]

Allaire et al.

[11] Patent Number: 5,250,243
[45] Date of Patent: Oct. 5, 1993

[54] METHOD FOR MAKING CERAMIC MATRIX COMPOSITES

[75] Inventors: Roger A. Allaire, Big Flats; Victor F. Janas, Horseheads, both of N.Y.

[73] Assignee: Corning Incorporated, Corning, N.Y.

[21] Appl. No.: 800,995

[22] Filed: Dec. 2, 1991

[51] Int. Cl.$^5$ .............................................. C04B 35/71
[52] U.S. Cl. ..................................... 264/63; 501/95; 264/60; 264/344
[58] Field of Search ........................ 264/60, 63, 344; 501/95

[56] References Cited

U.S. PATENT DOCUMENTS

| | | | |
|---|---|---|---|
| 4,158,688 | 6/1979 | Pett et al. | 264/63 |
| 4,314,852 | 2/1982 | Brennan | 501/95 |
| 4,588,699 | 5/1986 | Brennan | 501/95 |
| 4,615,987 | 10/1986 | Chyung | 501/95 |
| 4,689,188 | 8/1987 | Bhatt | 264/63 |
| 5,021,208 | 6/1991 | Ludwig | 264/344 |
| 5,024,978 | 6/1991 | Allaire et al. | 501/95 |
| 5,028,367 | 7/1991 | Wei | 264/63 |

*Primary Examiner*—James Derrington
*Attorney, Agent, or Firm*—Kees van der Sterre

[57] ABSTRACT

A method for making a ceramic matrix composite article wherein a dispersion of a ceramic matrix powder in a wax-containing thermoplastic vehicle is applied to an inorganic fiber reinforcement material to form a prepreg material such as a prepreg tow, and the tow is collected and formed into a preform for the article which is then subjected to binder burnout and consolidation, wherein the prepreg material is heated to a temperature sufficient to evaporate at least about 50% by weight of the wax component therefrom prior to the collection and forming of the material into the preform.

11 Claims, 1 Drawing Sheet

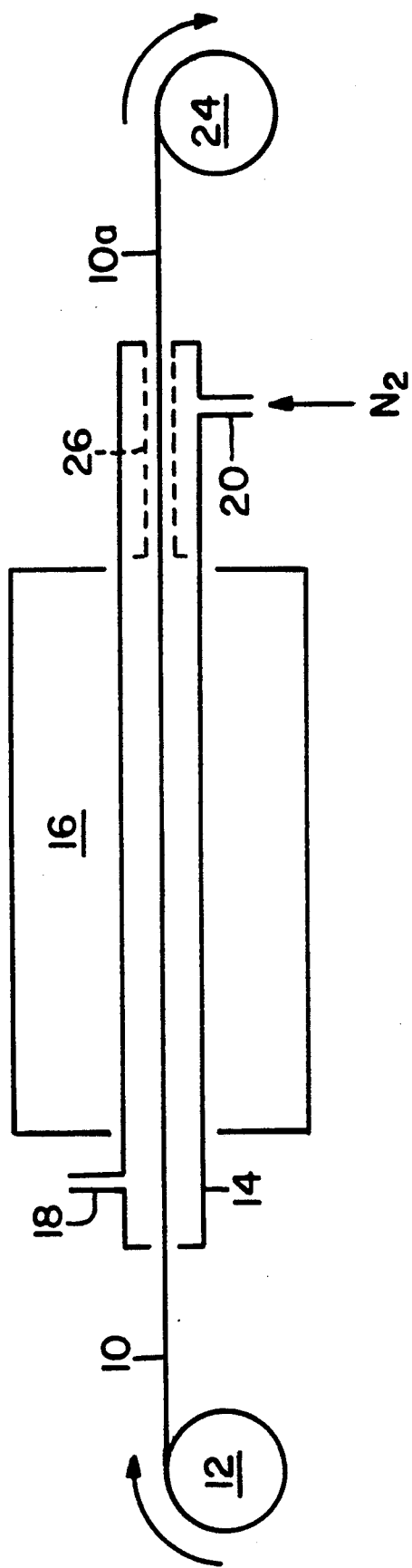

METHOD FOR MAKING CERAMIC MATRIX COMPOSITES

BACKGROUND OF THE INVENTION

The present invention relates to the manufacture of fiber-reinforced ceramic matrix composite articles, and more particularly to improvements in the process for manufacturing such composites with thermoplastic binder materials.

Ceramic matrix composites are well known. These composites typically comprise a ceramic matrix material such as a glass, a glass-ceramic, or a crystalline ceramic in which is disposed a reinforcing phase consisting of a multiplicity of refractory inorganic fibers. U.S. Pat. Nos. 4,314,852, 4,588,699 and 4,615,987 disclose examples of these materials and methods for their manufacture.

Conventional manufacturing processes for these composites have comprised, first, preparing a flowable suspension the ceramic matrix material in powdered form, coating or immersing the inorganic fibers (usually long fiber tows) with the suspension, and collecting the coated fiber tows, frequently into a mat or other shape. The impregnated fibers and shapes made therefrom are at this stage of the process commonly termed "prepreg". The prepreg thus provided can be reshaped as desired but is ultimately formed into a preform for the desired composite article, the preform is then subjected to a burn-out step wherein organic or other fugitive components present in the coating are removed from the preform, and the debindered preform is finally consolidated into a dense composite material by the application of heat and pressure.

Two different types of vehicle systems have been used for making the dispersions of ceramic matrix powders used in this process. The first type generally comprises substantial proportions of a solvent such as water or an organic liquid, with added organic binders to bind the powders together into a durable coating after the solvent has been removed by evaporation.

An alternative and more recently developed vehicle system, first disclosed in U.S. Pat. No. 5,024,978, utilizes a thermoplastic vehicle to form the ceramic powder suspension. Vehicles of this type are normally solvent-free, consisting almost entirely of low melting volatile waxes and organic polymer binders compatible therewith. Powder dispersions formed with these vehicles are room temperature solids which must be heated to reach the fluidity need for coating the fibers.

Prepreg formed with powder dispersions of the latter type does not require drying, since the vehicle solidifies as soon as the coated fibers are cooled. However, as a consequence of the fact that no solvents or other materials are removed during the course of prepreg and preform shaping, the resulting preforms incorporate higher proportions of organics at the burnout stage than prepreg formed with solvent-based ceramic powder suspensions. Thus prepreg with an organic component comprising 60 percent or more by volume is not uncommon using this process.

One consequence of this high binder content is that softening and extensive flow of the thermoplastic binder can occur during binder burnout. This can cause migration of the matrix powder within the preform, producing matrix-depleted and highly matrix-enriched regions within the resulting composite ceramic product. In addition, preform shrinkage between burnout and final consolidation is very high, increasing the difficulty of making complex shapes or achieving precise dimensions in the composite ceramic product.

Another difficulty with thermoplastic binder systems relates to prepreg instability during storage. Since volatile waxes constitute a major part of these binders, moderate storage temperatures must be maintained in order to avoid prepreg sticking. And, wax migration during storage or during collection of the prepreg after fiber coating can result in less-than-optimum textile quality in preforms formed by laying up or weaving the coated fiber tows into mats, tapes, or fabrics.

It is therefore a principal object of the present invention, to provide an improved process for the manufacture of ceramic matrix composites utilizing thermoplastic binders which reduces the sensitivity of the prepreg material to temperature variation in storage, reduces binder flow during burn-out, and improves the textile quality of prepreg materials provided from thermoplastic binder systems.

Other objects and advantages of the invention will become apparent from the following description thereof.

SUMMARY OF THE INVENTION

The present invention provides a new method for composite manufacture wherein a dewaxing process is used to reduce the volume of vehicle present in the impregnated or coated fiber tow prior to the incorporation thereof into a preform for the composite ceramic product. The result of this process is that the textile quality of prepreg tapes, mats and fabrics is considerably improved, while at the same time better prepreg storage characteristics are achieved. And, most importantly, binder movement and matrix migration during the burn-out of the dewaxed composite preforms are substantially reduced, significantly improving the quality of the resulting composite products.

In a principal aspect, then, the invention comprises an improvement in the method for manufacturing a ceramic matrix composite article from a wax-containing thermoplastic ceramic powder dispersion. The invention is generally applicable to any such method wherein a dispersion or suspension of a ceramic matrix powder in a thermoplastic vehicle comprising organic polymer binder and low-melting wax components is used, these vehicles being hereinafter sometimes referred to simply as thermoplastic vehicles. Conventionally, the ceramic matrix powder dispersions are applied to an inorganic fiber reinforcement material, eg., a fiber tow such as a silicon carbide fiber tow, and the fibers with applied dispersion (termed prepreg material) is then collected. The collected prepreg material, in the form of a tow or as a mat, tape or other shape is then formed into a preform of a desired configuration for the article, and the preform is subjected to binder burnout and hot pressing treatments to form the article.

In accordance with the invention, the process is modified in that, prior to shaping the collected prepreg into a preform for the article, the prepreg material is first heated to a temperature and for a time effective to evaporate at least some of the wax component from the thermoplastic vehicle present in the prepreg. Preferably, the heating temperature is sufficient to remove a substantial proportion (50% or more) of the wax from the prepreg, but is not high enough to remove (evaporate or extensively decompose) the organic polymer binder component(s) present therein.

In the preferred method, the prepreg material is dewaxed by exposure to a high temperature inert atmosphere, so that oxidation of the volatilized wax, and possible oxidation of the polymer binder components of the thermoplastic vehicle, are avoided. Most preferably, dewaxing is carried out in continuous fashion, either by treating the prepreg tow immediately after the dispersion-coated or impregnated fiber tow is withdrawn from the thermoplastic powder dispersion, or after it has been cooled and collected for storage. Dewaxing after the tow has been processed into prepreg shape such as a tape, sheet, mat or woven fabric is also possible, although this is generally not preferred.

We have found that, using waxes which can be easily volatilized, substantial wax removal from the prepreg material can be accomplished without removing or decomposing the polymer binder components of these thermoplastic vehicle systems. Thus the dewaxed tow or prepreg which is collected retains excellent reshaping characteristics, offering sufficient toughness and flexibility to form composite preforms of excellent durability in addition to greatly improved burnout and consolidation characteristics. Accordingly, ceramic matrix composites which are dense, void-free, and of excellent microstructural homogeneity, are possible.

DESCRIPTION OF THE DRAWING

The Drawing is a schematic cross-sectional illustration of apparatus useful for the dewaxing of thermoplastic prepreg fiber tow in accordance with the invention.

DETAILED DESCRIPTION

As will be appreciated from the foregoing description, the present invention is not limited to the use of any particular ceramic matrix material or composition. Instead, any of the known matrix materials employed for the manufacture of fiber-reinforced ceramic matrix composites may be used. These include powdered conventional glasses, such as powdered aluminosilicate glasses or powdered borosilicate glasses, as well as powdered thermally crystallizable glasses. The latter glasses, typically of aluminosilicate composition, can be thermally crystallized during consolidation of the composite preform to yield refractory glass-ceramic matrices comprising one or more of beta-spodumene, beta quartz, anorthite, cordierite, stuffed cordierite, barium osumilite, or other refractory crystalline materials as the principal crystal phases. Alternative ceramic matrix powders which can be used include conventional ceramic powders such as alumina, zirconia, silicon carbide, silicon nitrate, or the like.

Likewise, the invention is not limited in its application to a specific type of reinforcing fibers. Any of a wide variety of fibers and fibrous materials may be used. The particularly preferred fibers are silicon carbide (including silicon oxycarbide) or silicon nitride fibers. However, other fibers including those selected from the group consisting of carbon, glass, alumina, or mullite fibers may alternatively be used.

The most convenient form of fibers treatable in accordance with the invention is a fiber tow or yarn. However, other elongated forms of fiber amenable to dewaxing after coating or impregnation as herein described may alternatively be used. Examples of such fiber structures could include woven or non-woven fiber sheets, mats, fabrics, tapes, ribbons or the like.

The thermoplastic binders utilized to form dispersions of the described ceramic powders typically comprise organic polymer binders and volatile low-melting waxes as the primary components. In the preferred embodiment, the thermoplastic vehicle will comprise, in weight percent, about 10–40% of polymer binder components, 35–90% of volatile wax components, at least 60% total of polymer binder and volatile wax components, and 0–35% of optional additives including surface-active dispersants, polymeric plasticizers, and non-volatile waxes such as monolaurate and fatty ketone waxes.

The particularly preferred organic polymer binders will be selected from the group consisting of ultra high molecular polyethylene, polyethylene-acrylic copolymers such as ethylene/acrylic acid, acrylic co-polymers such as butyl methacryalate/acrylic acid copolymer, and thermoplastic elastomers such as styrene tri-block copolymers.

The preferred waxes are low-melting volatile waxes selected from the group consisting of fatty alcohol, fatty acid, fatty glycol, and fatty glyceride waxes which form crystalline solids at room temperature and have melting points not exceeding about 80° C. Of course, alternative polymer binders and waxes may be included in these thermoplastic vehicles with good results, the operability of the invention being limited only in that the compositions must comprise one or more wax components which can be at least partially volatilized at temperatures at which extensive decomposition of the organic polymer binders can be avoided.

As previously indicated, dewaxing is most preferably carried out on the prepreg material in its most simple structural form, eg., as fiber tow which has been impregnated with the matrix dispersion and either directly subjected to dewaxing or stored and then dewaxed prior to further shaping. It is possible to dewax complex prepreg shapes such as prepreg tape, sheet, or cloth, but such is not preferred since better tape, sheet and/or cloth quality can be achieved with dewaxed prepreg tow or fiber, and since tow dewaxing is more efficient and effective than the dewaxing of more complicated prepreg forms. Thus, as hereinafter more fully described, the dewaxing of prepreg fiber tow can conveniently by carried out on a continuous basis, for example by the uninterrupted transport of the tow through a heated dewaxing chamber. The temperature in the chamber and the dwell time of the tow in the chamber can readily be adjusted to control the temperature reached by the tow, and thus the extent to which wax is removed from the tow can be adjusted as desired.

The invention may be further understood by reference to the following examples showing the manufacture of ceramic matrix composites in accordance therewith.

EXAMPLE 1

A quantity of prepreg fiber tow is prepared in accordance with known practice as follows. First, a silicon carbide fiber tow, commercially available as Nicalon ® NLM-202 silicon carbide fiber tow from the Nippon Carbon Company of Tokyo, Japan is provided. This fiber tow, drawn from a supply reel as a long continuous multifiber strand, is desized in a tube furnace operating at 800° C. and is then transported through a melted dispersion of a thermally crystallizable glass powder in a thermoplastic vehicle.

The melted dispersion comprises 50% of glass powder and 50% of thermoplastic vehicle by weight. The vehicle consists of about 60 parts by weight of a fatty alcohol wax, 20 parts by weight of a triblock styrene-ethylene/butylene-styrene thermoplastic copolymer, 20 parts by weight of a polybutene resin plasticizer, and about 0.4 parts by weight of a dispersant. The wax used is ALFOLT ™ 1418 DDB fatty alcohol wax blend commercially available from the Vista Chemical Company of Houston, Tex., the thermoplastic block copolymer is Kraton ™ G1650 thermoplastic elastomer commercially available from the Shell Chemical Company, Houston, Tex., the plasticizer is Parapol 950 oil additive from Exxon Chemical Houston, Tex., and the dispersant is Hypermer KD3 dispersing agent commercially available from ICI Americas of Wilmington, Del.

The powdered glass used is a calcium aluminosilicate glass powder which is thermally crystallizable on appropriate heat treatment to yield a glass-ceramic matrix comprising anorthite as the principal crystalline phase. The glass powder has an average particle size of about 10 microns. The dispersion of this glass in the thermoplastic vehicle is maintained at about 130°–140° C. while the fiber tow is transported therethrough, in order to maintain low viscosity for good penetration of the dispersion into the tow. After transport through the liquified dispersion the resulting prepreg tow is cooled to room temperature and collected on a spool for subsequent dewaxing.

The proportion of volatile waxes present in prepreg yarn produced as described can be substantial, in many cases as much as 60 volume percent. Table I below reports the composition of a typical yarn produced in accordance with the above procedure. Included in Table I are the proportions of reinforcing fibers, powdered glass, polymeric binders, and volatile waxes, reported in both weight percent and in volume percent.

TABLE I

| Prepreg Component | Weight (%) | Volume (%) |
|---|---|---|
| Reinforcing fiber | 22 | 13 |
| Powdered glass | 39 | 21 |
| Polymeric binders | 8 | 13 |
| Waxes | 31 | 53 |

The dewaxing of prepreg tow produced as described is carried out in a dewaxing process wherein the tow is continuously transported through a heated dewaxing chamber. The dewaxing chamber used consists of a section of one-inch diameter glass tubing having a length of 34 inches. The glass used is Vycor ® brand 96% silica glass tubing having high resistance to thermal breakage.

The section of glass tube is set into an 18-inch tube furnace, both ends of the glass tubing extending out of the furnace hot zone. The furnace hot zone temperature is set sufficiently high that rapid heating of prepreg tow passing therethrough will occur, so that rapid dewaxing of the tow can be effected.

For most efficient continuous dewaxing of the tow in this apparatus, furnace hot zone temperatures well above the decomposition temperatures of the wax and polymer components of the thermoplastic vehicle are employed. Temperature control of the tow within the tube is then achieved by controlling the dwell time (transport rate) of the tow through the tube, as well as by controlling the temperature of the atmosphere in the tube.

The atmosphere in the tube consists of nitrogen, introduced by countercurrent flushing of the tube with 100% $N_2$ supplied at room temperature. This gas is fed into the tow outlet end of the glass tube at a flow rate of about 17.5 liters per minute, effecting greatest cooling of the tow at the outlet end of the furnace and thereby aiding in solidifying the polymers and residual waxes in the tow prior to collecting the dewaxed tow for further processing.

The dewaxing chamber employed is illustrated in the Drawing, which is a schematic elevations view in cross-section of the dewaxing apparatus, not in true proportion or to scale. As shown in the drawing, prepreg tow 10 is supplied from spool 12 into the end of glass tube 14 in continuous fashion. Tube 14, positioned within electrically heated tube furnace 16, is provided with gas outlet 18 and gas inlet 20, with $N_2$ gas being fed into the inlet in the direction shown by arrow 22. The dewaxed prepreg tow 10a is then collected on takeup reel 24. For most efficient cooling of the dewaxed tow exiting the tube, a gas cooling manifold 26 may be inserted into the outlet end of tube 14, so that the $N_2$ gas entering through gas inlet 20 may be flowed more directly and at higher velocities onto the surface of the exiting tow.

Utilizing the dewaxing apparatus shown, continuous lengths of prepreg fiber tow produced as above described are subjected to continuous dewaxing at several different furnace operating temperatures and tow transport speeds through the furnace. The results of these dewaxing runs are reported in Table I below.

Included in Table I for each of the dewaxing runs conducted are data respecting the furnace operating temperature, in degrees Celsius, the transport speed of the prepreg tow through the furnace hot zone, in meters per second, and the weight loss and approximate volume loss of wax from the fiber tow, in percent.

TABLE I

| Furnace Temp. (°C.) | Yarn Speed (m/s) | Weight Loss (%) | Volume Loss (%) |
|---|---|---|---|
| 800 | 0.36 | 15 | 22 |
| 612 | 0.36 | 10 | 15 |
| 412 | 0.36 | 9 | 13 |
| 700 | 0.25 | 37 | 54 |
| 700 | 0.18 | 36 | 53 |
| 600 | 0.13 | 19 | 28 |
| 600 | 0.09 | 22 | 33 |

The handling characteristics of dewaxed prepreg tows produced as described are generally good. The prepreg where oxidation of the polymers is avoided, good flexibility and toughness are retained, and the laying up of prepreg mat, tape or sheet can be accomplished by many of the same techniques applicable to the starting prepreg tow material.

To demonstrate these characteristics, a quantity of dewaxed prepreg tow produced by the procedure of the Example, treated to obtain a reduction in tow weight of about 17% (a volume reduction of 25%) during dewaxing, is formed into a prepreg mat. The fiber tow is collected after dewaxing onto a revolving drum, all of the collected tow being aligned in a common direction on the drum. The tow is maintained at an elevated temperature during collection in order to bond the accumulating tow into a unitary prepreg mat. The mat thus provided is removed from the collection drum and cut into 10 cm × 10 cm square mat sections, these then being stacked with tows aligned in a common direction to form a "unidirectional" preform for a fiber-reinforced ceramic matrix composite plate.

The preform thus provided is next subjected to a binder burn-out treatment comprising gradual heating in air to a burnout temperature of 550° C., this peak temperature then being maintained for a burnout interval of about four hours. After binder burnout, the preform stack is hot-pressed under inert atmosphere conditions to a peak consolidation temperature of about 1340° C., at a consolidation pressure of about 10.4 MPa, in order to provide a dense, substantially void-free fiber-reinforced ceramic matrix composite article.

Ceramic matrix composites produced as described exhibit excellent microstructural homogeneity in addition good strength and toughness. Table III below reports the properties of two composite samples produced by dewaxing, burnout, and hot-press consolidation as above described. Included in Table III for each of the samples reported are consolidated densities for the consolidated composites, in g/cm$^3$, microcrack stress and strain values, reported in MPa and %, respectively, and ultimate stress and strain values, also reported in MPa and %. The flexural strength data were determined in four-point bending at room temperature, using sample bars cut from the composite plates in accordance with conventional practice.

TABLE III

| Sample No. | Density (g/cm$^3$) | Microcrack Stress | Point Strain | Ultimate Stress | Failure Strain |
|---|---|---|---|---|---|
| 1a | 2.710 | 197 | 0.24 | 441 | 0.82 |
| 1b | 2.705 | 148 | 0.18 | 564 | 1.13 |

EXAMPLE 2

The dewaxing procedure of Example 1 is repeated utilizing dewaxing apparatus adapted to provide a longer dewaxing chamber. In this Example, a dewaxing chamber consisting of a Vycor TM brand 96% silica glass tube approximately 84 inches in length and having an inside diameter of 2 inches is employed. This tube is positioned within an elongated hot zone formed by a pair of electrically heated tube furnace operating in end-to-end abutment. No cooling section within the tube for the yarn traversing dewaxing chamber is provided.

The chamber is again provided with gas inlet and outlet means to permit flushing the interior of the dewaxing chamber with room temperature gas. However, in this case, the gas inlet is at the prepreg inlet end of the chamber, so that gas flow is in a direction parallel with the direction of prepreg tow travel through the furnace.

Sections of prepreg tow 500 meters in length produced as disclosed in Example 1 are passed through this dewaxing chamber at a rate of 9.1 feet per minute. Five sections are process using flowing air as the chamber atmosphere and five sections using nitrogen as the atmosphere. The flow rate of these gases is maintained at a flow rate of 8 liters per minute for all runs.

For the runs employing air as the flushing gas, a furnace temperature of 300° C. is maintained, resulting in prepreg tow weight losses during dewaxing which fall in the range of about 19-22% by weight (about 33-38% by volume). The dewaxed tow produced in these runs generally exhibited a brownish discoloration, indicating some degree of decomposition or degradation of organic components remaining in the prepreg yarn following dewaxing.

The tow samples dewaxed under nitrogen were processed at a somewhat higher chamber temperature of 350° C. These treatments produce weight losses in the range of about 24-33% (41-57% by volume) from the prepreg tow. Advantageously, no discoloration of the tow dewaxed under nitrogen is observed, indicating that higher dewaxing temperatures and faster dewaxing can be achieved under inert atmosphere conditions.

Experiments carried out for the purpose of forming these dewaxed prepreg tows into composite products indicated that both could be consolidated to fiber-reinforced ceramics exhibiting high density. However, ultimate flexural strengths for the samples dewaxed under nitrogen at the higher temperature were observed to fall over a slightly higher strength range than the samples which were dewaxed under air. Again, then, no adverse reactions or performance in the final composite products are observed to result from the higher temperature, neutral atmosphere treatment.

The advantages of the method of the invention in reducing the phenomenon of matrix flow during binder burnout are shown by a direct comparison of the debindering behavior of composite preforms produced with and without a prepreg dewaxing treatment as hereinabove described. Each preform evaluated consists a unidirectional prepreg stack formed of sections of prepreg mat, one stack being produced using dewaxed prepreg tow as described in Example 1 and one using standard prepreg tow not subjected to any dewaxing treatment.

The stack produced from the standard prepreg tow, consisting of sixteen 10 cm × 10 cm sheets of unidirectional prepreg mat is debindered at a peak temperature of 500° C. over a relatively long 30-hour debindering interval, this treatment being designed to reduce flow of the matrix dispersion during the burnout process. Nevertheless, examination of the treated stack showed evidence of extensive vehicle running and matrix powder migration.

The prepreg stack formed of tow subjected to the dewaxing procedure of Example 1 is formed of 24 unidirectional prepreg sheets about 3.75 cm × 7.5 cm in size, these sheets being formed of prepreg tow exhibiting a 20% weight reduction from the dewaxing treatment. This stack is processed using a relatively rapid binder burnout treatment lasting 14.5 hours and reaching a peak burn-out temperature of 550° C. In contrast to the stack produced using the standard prepreg tow, this debindered stack showed no evidence at all of vehicle running or matrix powder migration. Thus improved product homogeneity upon consolidation is assured.

Of course, the foregoing examples are merely illustrative of procedures and apparatus which could be utilized in the practice of the invention above described. Numerous modifications and variations upon these procedures and the apparatus described may be resorted to by those skilled in the art within the scope of the appended claims.

We claim:

1. In the method for making a ceramic matrix composite article wherein a dispersion of a ceramic matrix powder in a thermoplastic vehicle is applied to an inorganic fiber reinforcement material to form a prepreg material, the thermoplastic vehicle comprising, in weight percent, about 10-40% of polymer binder components, 35-90% of volatile wax components, at least 60% total of polymer binder and volatile was components, and 0-35% of optional additives selected from the group consisting of surface-active dispersants, polymeric plasticizers, and non-volatile waxes, the prepreg material is collected, the collected prepreg material is formed into a preform for the article, the preform for the article is subjected to binder burnout, and the preform is thereafter consolidated by the application of heat and pressure to form the article, the improvement wherein:

prior to forming the collected prepreg material into the preform, the prepreg is heated to a temperature sufficient to evaporate at least about 50% by weight of the volatile wax components from the thermoplastic vehicle but insufficient to remove the organic polymer binder component therefrom.

2. A method in accordance with claim 1 wherein the prepreg is heated in an inert atmosphere.

3. A method in accordance with claim 2 wherein the inorganic fiber reinforcement material is a continuous fiber tow.

4. A method in accordance with claim 3 wherein the fiber tow is formed of fibers selected from the group consisting of silicon carbide, silicon oxycarbide, and silicon nitride fibers.

5. A method in accordance with claim 4 wherein the ceramic matrix powder is a thermally crystallizable aluminosilicate glass which can be thermally crystallized during hot pressing to yield a refractory glass-ceramic matrix comprising at least one crystal species selected from the group consisting of beta-spodumene, beta-quartz, anorthite, cordierite, stuffed cordierite, and barium osumilite as the principal crystalline phase.

6. A method for making a ceramic matrix composite article which comprises the steps of:

(i) applying to an inorganic fiber tow a dispersion of a ceramic matrix powder in a thermoplastic vehicle, the thermoplastic vehicle comprising, in weight percent, about 10–40% of polymer binder components, 35–90% of volatile wax components, at least 60% total of polymer binder and volatile wax components, and 0–35% of optional additives selected from the group consisting of surface-active dispersants, polymeric plasticizers, and non-volatile waxes, thus to provide a prepreg fiber tow;

(ii) heating the prepreg fiber tow to a temperature and for a time sufficient to evaporate at least about 50% by weight of the volatile wax components from the thermoplastic vehicle but insufficient to remove the organic polymer binder component therefrom, thus to provide a dewaxed fiber tow;

(iii) collecting the dewaxed fiber tow and forming it into a prepreg shape;

(iv) forming the prepreg shape into a preform for the ceramic matrix composite article;

(v) heat treating the preform to remove remaining vehicle constituents therefrom; and (vi) consolidating the preform by the application of heat and pressure to form the ceramic matrix composite article.

7. A method in accordance with claim 6 wherein the inorganic fiber tow is a tow comprised of silicon oxycarbide fibers, and wherein the prepreg shape is selected from the group consisting of prepreg sheet, mat, collimated tape and woven fabric.

8. A method in accordance with claim 6 wherein the prepreg fiber tow is heated in an inert atmosphere.

9. A method in accordance with claim 6 wherein the prepreg fiber tow is heated by uninterrupted transport through a heated dewaxing chamber.

10. A method in accordance with claim 6 wherein the organic polymer binder components present in the thermoplastic vehicle are selected from the group consisting of ultra high molecular polyethylene, polyethylene-acrylic copolymers, acrylic co-polymers, and thermoplastic elastomers.

11. A method in accordance with claim 10 wherein the volatile wax components present in the thermoplastic vehicle are selected from the group consisting of fatty alcohol, fatty acid, fatty glycol, and fatty glyceride waxes forming crystalline solids at room temperature and having melting points not exceeding about 80° C.

* * * * *

UNITED STATES PATENT AND TRADEMARK OFFICE
CERTIFICATE OF CORRECTION

PATENT NO. : 5,250,243

DATED : October 5, 1993

INVENTOR(S) : Roger A. Allaire and Victor F. Janas

It is certified that error appears in the above-identified patent and that said Letters Patent is hereby corrected as shown below:

Col. 6, line 30, "Table I" should be "Table II"

Col. 6, line 31, "Table I" should be "Table II"

Col. 6, line 37, "Table I" should be "Table II"

Signed and Sealed this

Twenty-first Day of June, 1994

Attest:

BRUCE LEHMAN

Attesting Officer

Commissioner of Patents and Trademarks